No. 875,108. PATENTED DEC. 31, 1907.
A. J. REID.
BRAKE FOR RAILWAY AND OTHER VEHICLES.
APPLICATION FILED DEC. 1, 1906.

3 SHEETS—SHEET 1.

Witnesses
Percy Newell
M. J. Candrick

Inventor
Aubrey J. Reid
per Fred Walsh
Attorney

No. 875,108. PATENTED DEC. 31, 1907.
A. J. REID.
BRAKE FOR RAILWAY AND OTHER VEHICLES.
APPLICATION FILED DEC. 1, 1903.

3 SHEETS—SHEET 2.

Witnesses
Percy Newell

Inventor
Aubrey J. Reid
per Fred Walsh
Attorney

No. 875,108. PATENTED DEC. 31, 1907.
A. J. REID.
BRAKE FOR RAILWAY AND OTHER VEHICLES.
APPLICATION FILED DEC. 1, 1906.

3 SHEETS—SHEET 3.

Witnesses
Percy Newell
M. J. Kendrick

Inventor
Aubrey J. Reid
per Fred Walsh
Attorney

UNITED STATES PATENT OFFICE.

AUBREY JAMES REID, OF NORTH SYDNEY, NEW SOUTH WALES, AUSTRALIA.

BRAKE FOR RAILWAY AND OTHER VEHICLES.

No. 875,108.  Specification of Letters Patent.  Patented Dec. 31, 1907.

Application filed December 1, 1906. Serial No. 345,929.

*To all whom it may concern:*

Be it known that I, AUBREY JAMES REID, a subject of the King of Great Britain, residing at Mount Street, North Sydney, in the State of New South Wales and Commonwealth of Australia, bank-clerk, have invented new and useful Improvements in Brakes for Railway and other Vehicles, of which the following is a specification.
This invention relates to certain improvements in brakes which though specially applicable to railway tramway and motor vehicles are also usable on road vehicles. And this invention has been specially devised in order to produce a simple and effective brake for the running wheels.

In order that this invention may be clearly understood reference will now be made to the drawings accompanying and forming part of this complete specification showing a brake and appurtenances according to these present improvements as applied to railway or tramway vehicles.

Figure 1:
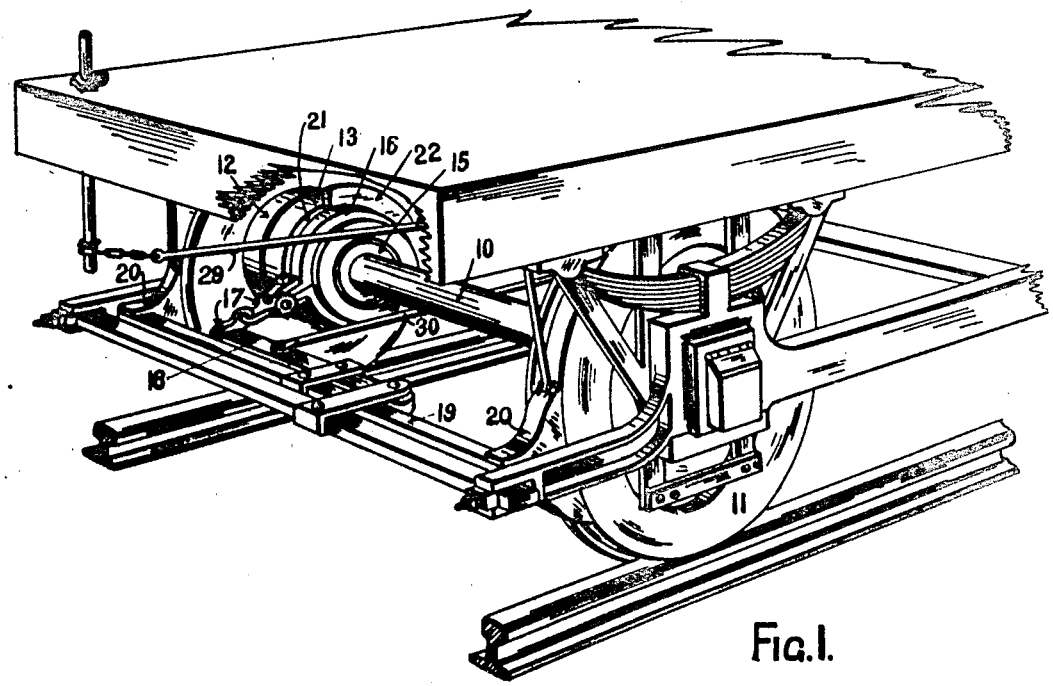
Figure 2:
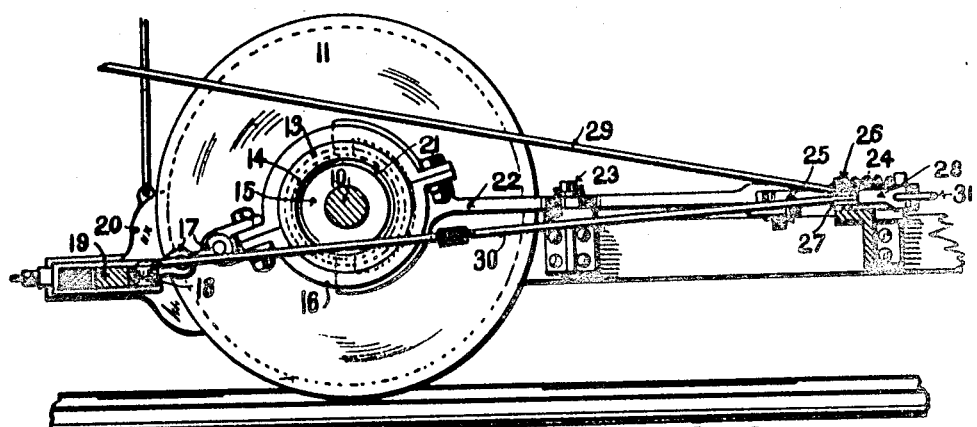
Figure 3:
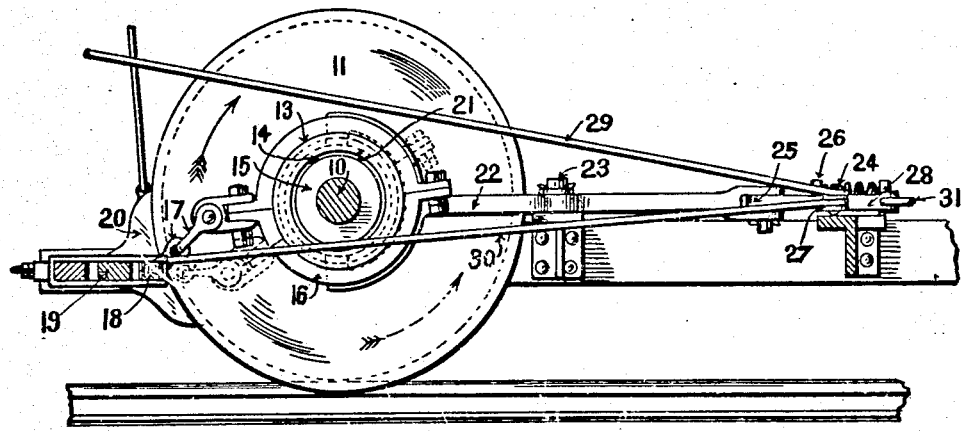
Figure 4:
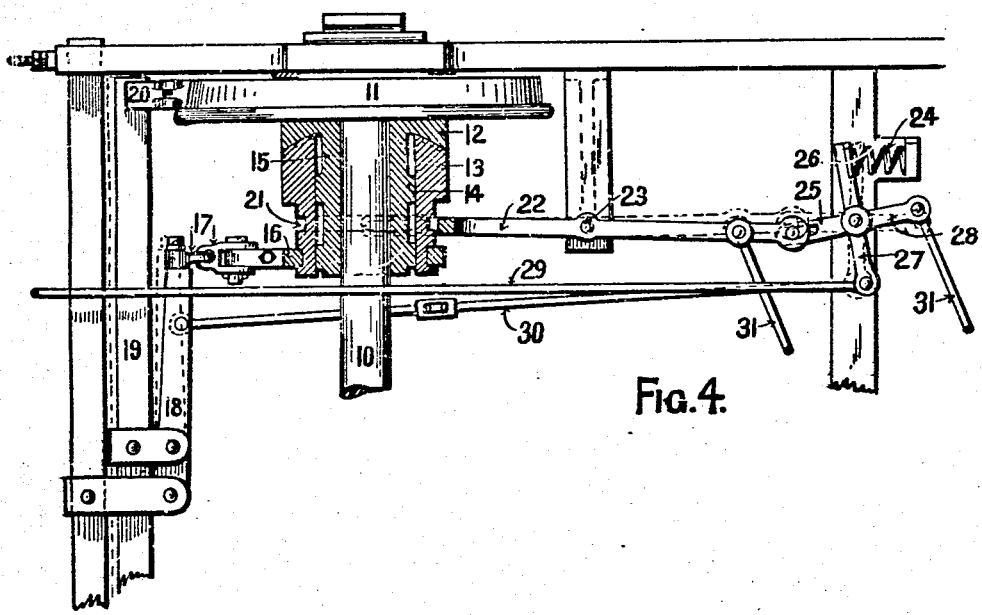
Figure 5:
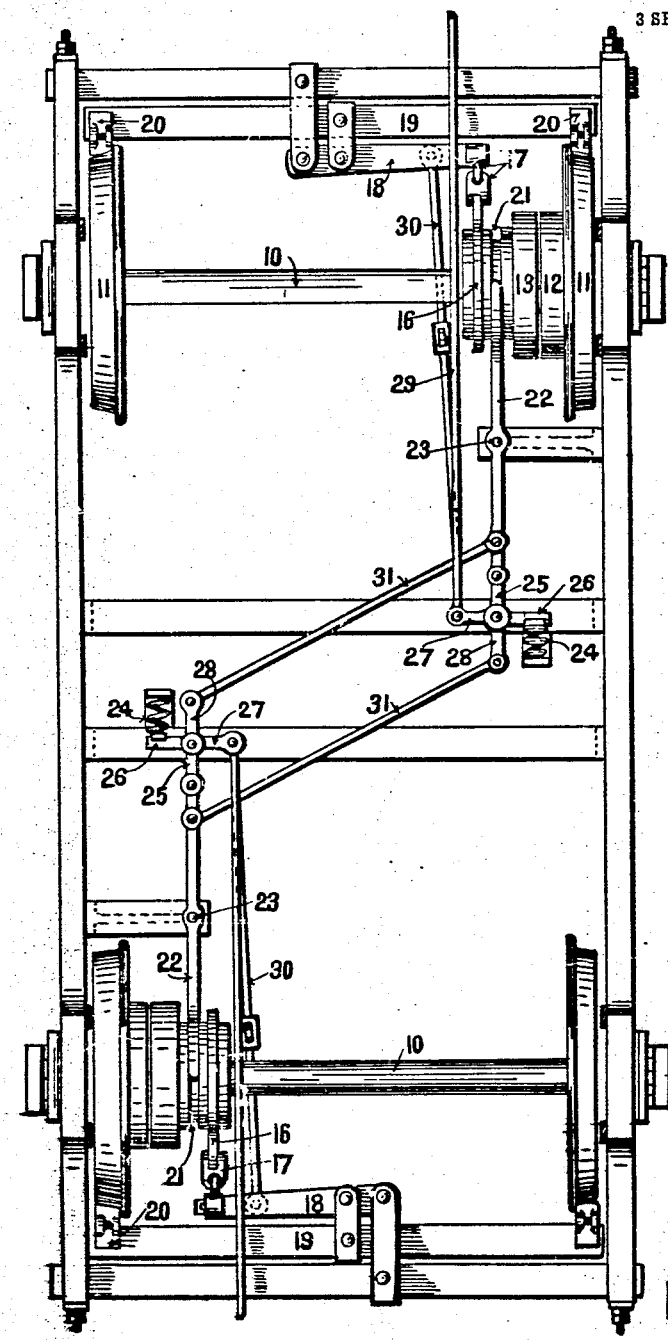

Figure 1 is a partial perspective view of the brake mechanism applied to a tramway vehicle. Fig. 2 is a longitudinal sectional elevation of the parts shown in Fig. 1 with the brake in normal "off" position. Fig. 3 is a similar view to Fig. 2 with the brakes in "on" position showing in full lines the wheels revolving clockwise and in dotted lines the wheels revolving anti-clockwise. Fig. 4 is a partial sectional plan of Fig. 3 showing by dotted lines the position of the parts in Fig. 2. Fig. 5 is a plan of so much of the under gear of a tramway vehicle necessary to show the brake gear complete for two pairs of wheels.

Fast to the axle 10 or the wheel 11 is the male member 12 of a friction clutch whose female member 13 rides free upon the rings 14 of the sleeve 15 extending from said male member 12. This female member 13 has tight straps 16 linked or otherwise connected by link 17 to the lever 18 operating the brake bar 19 carrying the brake blocks 20. The clutch fork or lever 22 engages with the male member 12 in grooves 21 and causes contact and disengagement of the two members of said clutch as it is operated. This clutch lever 22 is fulcrumed on a fixed pin 23 (from the vehicle underframing or body) and extends therefrom to one member 25 of a double bell crank another member 26 of which abuts against a thrust spring 24 the force of which is exerted as shown in Figs. 3 and 4 unless it is under control of the operating rod 29 connected to the third member 27 of the double bell crank and which rod 29 normally is locked in "pulled" position as shown in Figs 1, 2 and 5 retaining the brake "off" the wheels. The third member 27 of the double bell crank is also connected by push rod 30 to the lever 18 of the brake bar 19 so as to operate said brake bar 19 into "off" position on the "pulling" of the controlling rod 29.

When the controlling rod 29 is released the spring 24 actuates the double bell crank whose member 25 operates the clutch lever 22 causing the two members 12 and 13 of the clutch to be placed in contact so that a braking power is applied to the hub of the wheel. At the same time the straps 16 will by means of link 17 operate the lever 18 to draw the brake bar 19 toward it and apply the blocks 20 of the peripheral tread of the wheel 11 and thus apply braking power thereto. The braking power so applied at hub and at periphery will have very great effect and bring the vehicle to a very early stop. If desired to insure very quick release of the brake blocks 20 from the wheels the rod 30 may be divided and joined by a thrust spring (not shown) and so insure almost instant separation of said blocks 20 and the wheels when the members 12 and 13 of the clutch are disengaged.

In order to operate the brake of both pairs of wheels having identical brake gears from either end of the vehicle the gears or operating mechanism are connected by parallel rods 31 connected to the fourth member 28 of the operating bell crank and to the clutch lever 22 so that one controlling rod 29 being loose and the other being "pulled" the brakes of both pairs of wheels are off and on it being released both wheels will be "braked." These brakes and the parallel rods 31 are shown in a position to clear certain driving or other gear on the axle but they may be placed in other positions to pull longitudinally with the car on suitable levers or spurs and would be so positioned should both brake clutches of the two pairs of wheels be on the one side of the vehicle and not on the opposite sides as shown.

In studying the action of this brake it must be borne in mind that the normal position of this brake in full application is caused by the springs 24 keeping the clutch 13 closed unless a counter strain is kept on pull rod 29. On starting the car tension is put on pull rod 29 causing springs 24 to be compressed when lever 22 will throw the clutch out of gear allowing the wheels and axles to freely rotate. To steady up or stop the car tension is taken either fully or partly off rod 29 by any well known devices thus allowing the spring 24 to bring the clutch member 13 into action. As the faces of clutch members 12 and 13 come together the friction will cause the clutch member 12 to revolve causing the band 16 to take an upward or downward pull according to the direction of rotation. This band 16 cannot rotate further than link 17 will allow it owing to said link 17 pulling the brake shoe lever 19 and thus causing the brakes 20 to be applied.

It will be seen then that a double action is caused by clutch member 13, viz., the action of itself as a friction brake on the wheel hub or the axle and the putting on of the brakes by means of the rotation and friction of the clutch through band 16 link 17 and lever 19. To cause the brakes to act as service stops it is not necessary to put clutch 13 hard home but only so far as would allow of sufficient friction to steady the axles and to cause the wheel brakes to be applied. To act as an emergency brake the pull rod 29 is wholly released and the clutch member 13 is thus thrown hard home by spring 24 causing the moving clutch member 12 to instantly rotate and put the brakes hard "on" the wheels being kept from skidding by manipulating the rod 29 as required to counteract the action of spring 24. The working of this brake which is not dependent as in the air brake on a fine adjustment of piston stroke requires little or no adjustment to keep it in order the only skill required being to impart a series of cushioning effects against the tendency of the spring 24 to rapidly close the clutch.

Having now fully described and ascertained my said invention and the manner in which it is to be performed, I declare that what I claim is:—

1. A brake for railway and other vehicles having a plurality of rotating members, a clutch connected with each, means controlled by the movement of the clutches for applying the brakes to the peripheries of the rotating members, and means for simultaneously actuating the clutches.

2. A brake for railway and other vehicles having a rotating member carrying one member of a clutch, a second clutch member adapted to engage with the first clutch member and connected to mechanism to apply the brake to the periphery of the rotating member, and a spring for moving the clutch members into engagement, the said spring being under compression when the members are disengaged.

3. A brake for railway and other vehicles having a clutch member connected to and rotating with a rotating member of the vehicle, and a second clutch member adapted to engage therewith, means actuated by the engagement of the clutch members for applying the brakes to the rotary member, a spring under compression while the clutch members are out of engagement, and a controlling rod in tension for compressing said spring.

4. A brake for railway and other vehicles, which comprises clutch members, one of such members being connected to rotate with the wheels, means for engaging clutch members and connections between one of the clutch members and a brake shoe engaging with the periphery of the wheel, the said connections comprising a lever pivoted to a fixed portion of the vehicle and to the brake beam and a link connecting the lever and the moving clutch member.

5. A brake for railway and other vehicles, which comprises two clutch members, and means for applying the brakes by engagement of the clutch members, a lever for engaging the clutch members, and a double bell-crank lever having one arm connected to the clutch operating member, a second arm connected to a push rod, which in turn is connected to the brake operating mechanism, and a third arm connected to a spring under tension when the clutch members are separated.

6. A brake for railway and other vehicles, having a clutch member connected to a wheel, a moving clutch member adapted to engage with the wheel-carried clutch member, means for engaging the clutch members together a connection between the moving clutch member and a brake on the periphery of the wheel, such connection including a tight band upon the moving clutch member.

7. A brake for railway and other vehicles, which comprises two sets of clutches, in connection with two axles, means for applying the clutches, means operating to apply the brakes to the periphery of the wheels by the engagement of the clutches, such means comprising four arm bell-crank levers, one arm of each lever being connected to a lever for engaging a clutch, another arm of each lever being connected to a push rod for disengaging the brake, the third arm of each lever being connected to a spring under compression, and the fourth arm of each lever being connected to the clutch-engaging lever of the other clutch.

In testimony whereof I have signed my name to this specification in the presence of two subscribing witnesses.

AUBREY JAMES REID.

Witnesses:
PERCY NEWELL,
M. J. CANDRICK.